T. LESLIE.
Fountain, Aquarium, and Flower-Pot Stands.

No. 147,849. Patented Feb. 24, 1874.

Witnesses
Charles L. Barritt
R. Rowley

Inventor
Thomas Leslie

UNITED STATES PATENT OFFICE.

THOMAS LESLIE, OF BROOKLYN, NEW YORK.

IMPROVEMENT IN FOUNTAIN, AQUARIUM, AND FLOWER-POT STANDS.

Specification forming part of Letters Patent No. 147,849, dated February 24, 1874; application filed December 19, 1873.

*To all whom it may concern:*

Be it known that I, THOMAS LESLIE, of Brooklyn, Kings county, State of New York, have invented an Improved Fountain, Aquarium, and Flower-Pot Stand, of which the following is a specification:

The object of my invention is to combine with a flower-pot stand, made of conical shape, a succession of water-troughs, one above the other, and a spraying-jet of water projecting from the apex of the cone, whereby the flowers will be constantly supplied with moisture to promote their growth, and the drip therefrom and excess of water discharged from the jet collected in the succession of troughs for the accommodation of gold and other fish, &c., suitable for aquariums.

But, to describe my invention more particularly, I will refer to the accompanying drawings forming a part of this specification, the same letters of reference wherever they occur referring to like parts.

Figure 1:
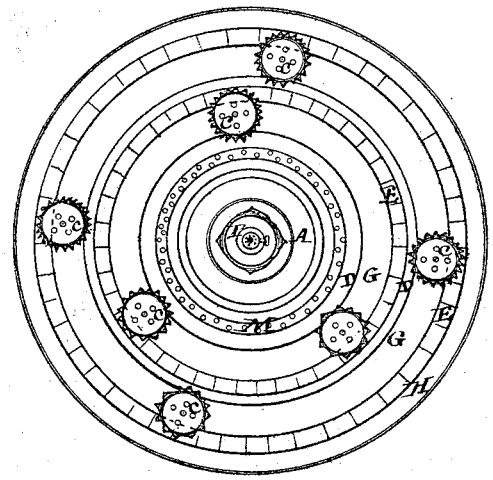
Figure 2:
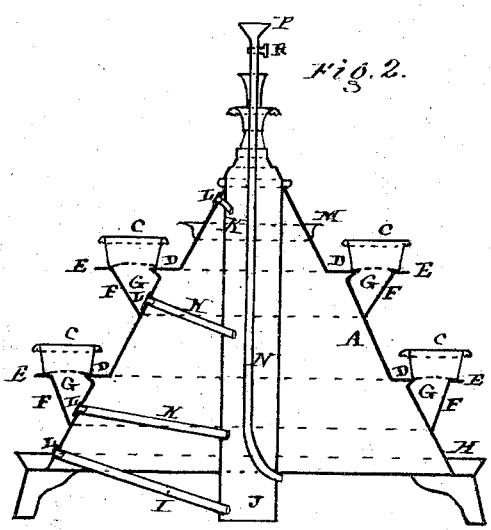

Figure 1 is a plan view of the stand. Fig. 2 is a vertical section of the same.

A represents the cone-shaped stand, which, according to size and place where used, is intended to be made of either cast metal or sheet metal. For the purpose of making supports or shelves for the flower pots or boxes C, the cone, as shown at D, Fig. 2, is diminished in area, so as to leave a ledge projecting outward therefrom to form a support for one side of the flower pot or vase, while the opposite side of the pot or vase is supported by a flange, E, on the upper edge of the outer wall F of the water troughs or basins G. According to the size and desire of persons using the apparatus, one, two, or more basins and stands may be made. Each of these basins are so proportioned in diameter as to receive the overflow of water from the one next above, while the basin H at the base of the cone finally receives the surplus water, which, by means of a pipe, I, is carried off to the central waste-water pipe J. In connection, also, with this waste-water pipe, are conduit-pipes K from the sides of the several basins. The object of these pipes is to admit of the basin's being washed out when required, which is effected by opening the screw-caps L within the basins. At the point M is a small basin with a perforated lip or flange, which is intended to cause the overflow of water from it to fall somewhat in a sheet down the upper face of the cone to the uppermost basin and flower-pot stand. For the purpose of supplying the water, a pipe, N, is carried up through the waste-water pipe and out at the apex of the cone, and capped with a spraying or rose sprinkler, P, having a suitable cock, R, in the stem of the sprinkler to cut off or regulate the flow of water through it.

It will thus be seen that the spray of water will not only produce a pleasing effect as a fountain, but at the same time will supply the aquariums for ornamental fish-preserves, and wet the plants arranged upon the stand to promote their growth.

It will be obvious that the circular shape of the cone is not indispensable. A square or other many-sided cone-shaped stand may be made to combine the improvements hereinbefore described.

I therefore do not limit my invention to a circular-shaped cone, but purpose making the apparatus of any angular sides found most convenient for the place where it is to be used.

Having now described my invention, I will proceed to set forth what I claim and desire to secure by Letters Patent of the United States:

1. The combination of the cone-shaped stand A, with one or more water-basins, G, having flanges and ledges D and E, and water-sprinkler jet P, substantially as described.

2. The combination of the cone-shaped stand A, having ledge D, with the waste-water pipe J, conduit-pipes I and K, and flanged water-basins G, substantially as described.

THOMAS LESLIE.

Witnesses:
 CHARLES L. BARRITT,
 R. ROWLEY.